(No Model.) 2 Sheets—Sheet 1.
E. CHRISTMAN, T. BRENNAN, Jr. & L. W. HOMIRE.
SEEDING MACHINE.
No. 602,827. Patented Apr. 26, 1898.
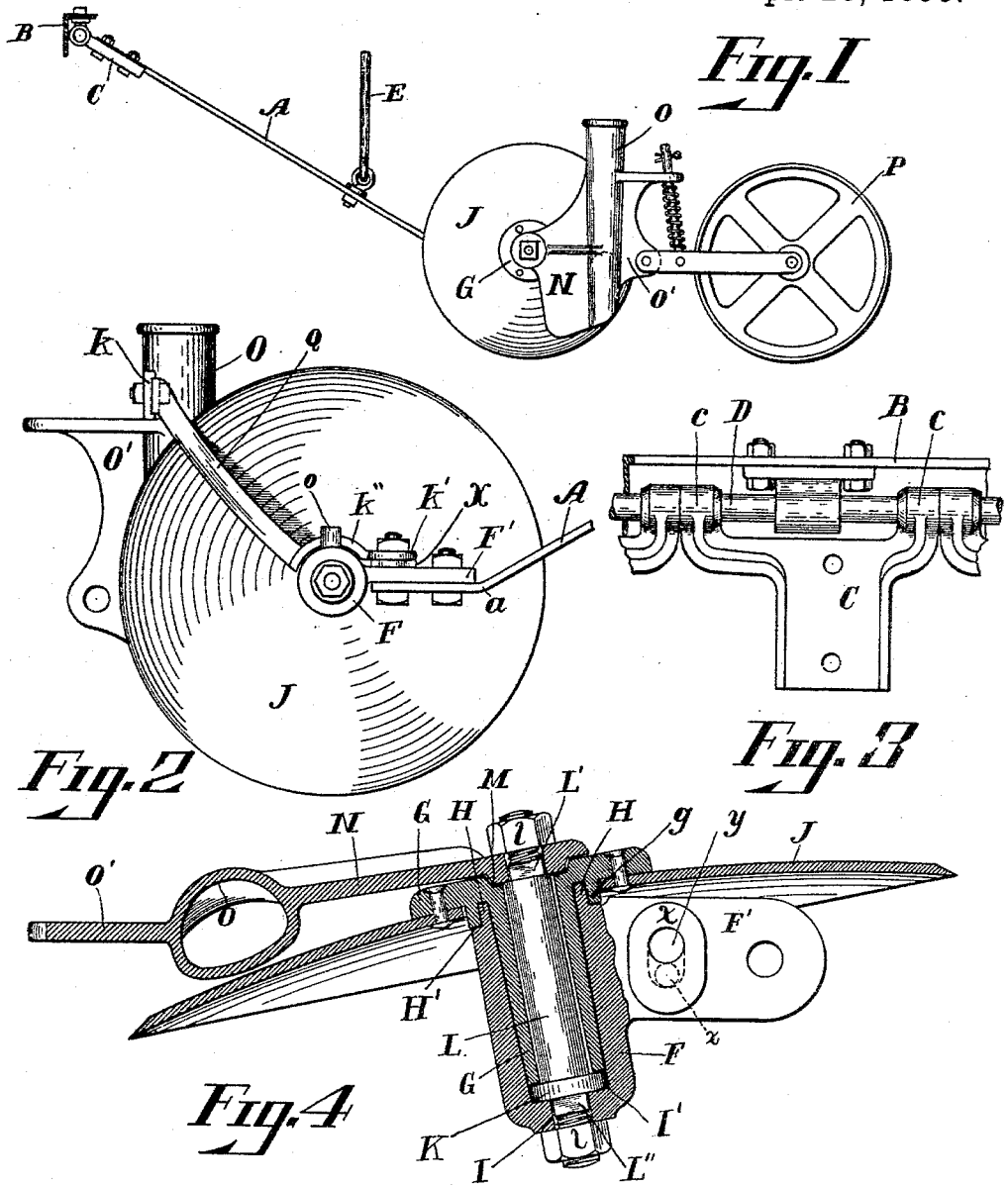
Witnesses
George Heidman
Harvey Edwards
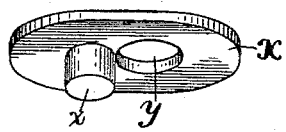
Fig. 5
Inventors
Edward Christman
Thos. Brennan Jr.
Leverett W. Homire
by Arthur Steur atty (No Model.) 2 Sheets—Sheet 2.

E. CHRISTMAN, T. BRENNAN, Jr. & L. W. HOMIRE.
SEEDING MACHINE.

No. 602,827. Patented Apr. 26, 1898.

WITNESSES
George Heidman
Harvey Edwards

INVENTORS
Edward Christman
Thos. Brennan Jr
Leverett W. Homire
by Arthur Stem Atty

UNITED STATES PATENT OFFICE.

EDWARD CHRISTMAN, THOMAS BRENNAN, JR., AND LEVERETT W. HOMIRE, OF LOUISVILLE, KENTUCKY, ASSIGNORS TO THE BRENNAN & CO. SOUTH-WESTERN AGRICULTURAL WORKS, OF SAME PLACE.

SEEDING-MACHINE.

SPECIFICATION forming part of Letters Patent No. 602,827, dated April 26, 1898.

Application filed March 6, 1897. Serial No. 626,267. (No model.)

*To all whom it may concern:*

Be it known that we, EDWARD CHRISTMAN, THOMAS BRENNAN, Jr., and LEVERETT W. HOMIRE, citizens of the United States, residing at Louisville, county of Jefferson, State of Kentucky, have invented certain new and useful Improvements in Seeding-Machines, of which the following is a full, clear, and exact description, reference being had to the accompanying drawings, forming part of this specification.

Our invention relates to improvements in seeding devices, and especially to the construction and arrangement of the device for forming the furrow and covering the seed discharged therein from a grain-drill or seeding-machine.

The object of our invention is to provide a simple and effective construction of a planting device adapted to be readily attached to the grain-drill or other seeding-machine, the construction being such that the furrow into which the seed is dropped is formed by revolving disks or colters instead of the ordinary planting-shoes. The device can also be used without the grain-hopper as a rotary spring-pressure disk harrow.

The construction, combination, and arrangement of the various parts forming the invention will be hereinafter more fully described, and pointed out in the claims.

Figure 6:
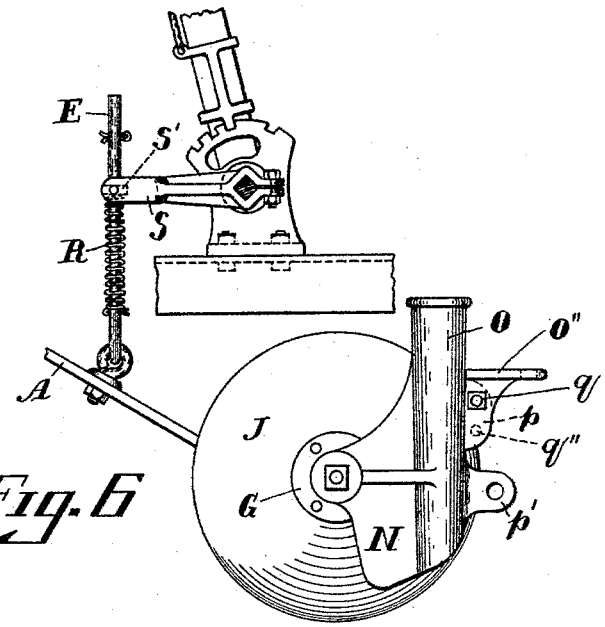
Figures 7, 8:
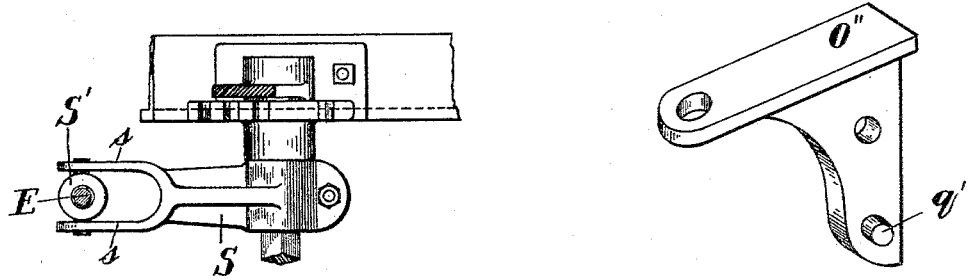

In the accompanying drawings, Figure 1 is a side elevation of one of the seeding devices or harrow-disks, a number of which are used on a single grain-drill. Fig. 2 is a side elevation showing the reverse side of Fig. 1 of the disk or colters and attachments. Fig. 3 is a top plan view of the hanger for attaching the drag-bar to the frame of the machine. Fig. 4 is a horizontal cross-section through the center of the disk, showing the construction and arrangement of the parts and mode of attachment. Fig. 5 is an elevation of the washer for adjusting the connection between the disk and the drag-bar. Fig. 6 is a side elevation showing a modified form of the grain-spout and the rock-shaft and pressure-arm. Fig. 7 is a top plan view showing a small portion of the rock-shaft and pressure-arm operated by the same. Fig. 8 is a side elevation of the bracket to be attached to the grain-spout.

Like letters of reference indicate identical parts in all the figures.

In the drawings we have not shown the frame of the machine which carries the hopper, &c., as this special planting mechanism may be attached to any of the usual forms of grain-drill.

A is a drag-bar, the forward end of which is pivotally attached to the frame of the grain-drill at B. This drag-bar A is preferably made of a flat bar of steel, bolted to the hanger C. The hanger C is provided with extending arms $c\ c$, with lateral openings to receive the pivot-bar D, this bar being fastened to the frame B. These arms of the hanger C extend out far enough on either side to secure a wide bearing on the bar D and prevent twisting and also far enough to abut against similar arms on the other hangers on either side, so as to prevent lateral play. The pivotal connection of the drag-bar to the frame B of course permits it to move up and down freely under control of the pitman E and usual arm, rock-shaft, and ratchet-lever. A spiral spring R is attached over this pitman E and is arranged to produce a downward pressure on the drag-bar and consequently upon the disk. The pressure-arm S, attached to the rock-shaft, which is operated by a lever in the usual manner, is provided at its front end with a yoke $s\ s$, in which is pivoted the washer S'. The upper end of the pitman E passes through the hole in this washer, and the upper end of the spiral spring R bears against the under side of this washer S', and it can of course be adjusted so as to regulate the downward pressure of the pitman on the drag-bar to suit various conditions.

It is sometimes desirable to depend upon the resiliency or elasticity of the drag-bar itself without the intervention of the spiral spring R. In that case the spring is simply omitted and the pitman E is fastened pivotally to the pressure-arm S. This drag-bar A of course slants downwardly from the frame at B. In order to secure a straight or horizontal pull, it may be bent at $a$, so that the rear end of it is substantially horizontal, as is shown. It may also be connected to the hub F without the bend at a, although the bend tends to conform more to the line of draft. At this rear end of the drag-bar A is attached a hub F, preferably at an angle to the line of draft. The interior opening of this hub F tapers somewhat toward the outer end to receive and fit over the stud G and is also provided with the annular projection or ring H, leaving a shoulder at H'. At the outer end of the hub F there is a square opening I with a shoulder I'.

J is a concavo-convex disk. To this disk is attached rigidly, by bolts or otherwise, a stud G, tapering to fit within the hub F. This stud G is provided with an annular flange g, extending on the concave side of the disk, which fits over and around the annular projection H on the hub F and up against the shoulder H', so as to form a dust-guard and prevent dirt or dust getting into the bearings.

L is a pin. At either end it is provided with square portions L' and L'', and the ends are screw-threaded to receive the nuts l l, and at the outer end it is provided with a collar K. This pin is inserted in the hub F with the collar K bearing against the shoulder I' and the square portion L'' fitting within the square opening I in the end of the hub F, the threaded portion extending through the hub to receive the clamping-nut l on its outer end. When this pin is seated in its place and the nut l turned down, drawing the collar K up against the shoulder I', the pin is held firmly in place. The stud G, which is rigidly attached to the disk J, being inserted within the hub F and over the pin L, the outer end of the pin L extends beyond the disk. The stud G has an annular recess on the outer or convex side of the disk, within which fits an annular boss M on the grain-spout carrier N. This grain-spout carrier N is provided with a square opening to fit over the square portion L' of the pin L and is held in place by the clamp-nut l, the distance between the inner side of the collar K and the shoulder on the pin L, formed by the square portion at L', being slightly greater than the length of the opening in the stud G, so that the annular boss M bears against this shoulder on the pin L, formed by the square portion L', and leaves the disk J free to revolve. The annular boss M, fitting within the annular recess in the stud G, serves to exclude dust and grit from the bearings.

O is a hollow tube forming a grain-spout which receives the seed from the hopper above by means of conducting-tubes in the usual manner and delivers it in the furrow formed by the disk J. This grain-spout O is supported by what we have called the "spout-carrier" N. Both the spout O and the extension or carrier N are preferably cast in one piece, and this carrier N is extended down, as shown in Fig. 1, slightly to the rear and slightly beneath the convex side of the disk J. This portion forms a scraper to remove the dirt that might adhere to the disk and at the same time protects the discharging grain from weeds, stubble, roots, falling dirt, &c., that might obstruct the free passage of the grain to the furrow formed by the disk and acts as a sort of shield to the furrow until the grain has been discharged into it. This spout-carrier or wing N may be curved slightly to conform more or less to the convex surface of the disk J. To the rear of the spout O and attached to it is the extension or wing O', to which the usual covering-wheel P is attached, which may be governed or regulated by spring-pressure, as shown.

Instead of having the extension or wing O' of the spout O made solid with the spout, as shown in Fig. 1, it may be arranged as shown in Fig. 6, in which the two lugs p and p' are cast solid with the spout, and when pressure-wheels are used a bracket O'' can then be attached to the upper lug p by a bolt q, a lug q' being cast on the bracket O'', which fits into a hole q'' in the lug p, holding the bracket O'' firmly and rigidly in place. If instead of the pressure-wheels drag-chains are used, they can be attached to the lower lug p'.

To provide a scraper to remove any dirt that might adhere to the concave side of the disk J and at the same time furnish additional support to receiver O, the scraper or support Q is arranged, one end being bolted to the grain-spout O by means of the lug k. This scraper or support is curved so as to conform sufficiently to the concave surface of the disk, and the lower end is bolted to the hub F at k' and may or may not be provided with a yoke k'', resting upon the top of the central portion of the hub F and at the same time covering the joint between the hub F and the stud G, as at H', to protect the same from dust, &c., falling from disk J.

o is an opening through the wall of the hub F, through which the bearings within it may be oiled. The bolt-holes at both ends of the scraper Q are made slotted, so as to adjust the scraper near or farther from the face of the disk.

We have shown the hub F provided with a horizontal wing or extension F', made integral with it and by which it is bolted to the drag-bar A. It is sometimes desirable to change the angle of the disk J with relation to the line of draft. For that purpose the rear bolt-hole in this wing F' on the hub F is made elongated or in the shape of a slot, so that the angle between the drag-bar and the hub may be changed, the forward bolt acting as a pivot.

X is a washer having a lug x. By loosening and removing the bolt from the bolt-hole Y the drag-bar and the hub may be shifted to the other side and washer X reversed, so that the lug x fills the unoccupied portion of the slot in the wing of the hub F', holding the drag-bar and the hub rigidly together at a different angle.

We have only shown one lug on the washer;

but any number of lugs with a suitably-shaped hole in the wing F' to admit of more than one adjustment of the disk or hub may be used. This adjustment of the hub or disk on the drag-bar may be effected also by means of a tempered screw or other suitable device, the washer being only one convenient form and may be used when the drag-bar is attached to either side of the disk. This adjustment of the angle of the disk to the line of draft is particularly useful when the machine is used as a disk harrow, in which case it is often necessary to change the angle of the disks to adapt them to different conditions of soil. In that case the grain-spout, pressure-wheel, &c., of course are removed.

Having thus described our invention, what we claim, and desire to secure by Letters Patent, is—

1. In a grain-drill having furrow-openers consisting of concavo-convex disks rigidly attached to studs on the convex side of said disk, said stud passing through to the concave side and fitting within hubs, with drag-bars attached only to the concave side of said disks, substantially as and for the purpose described.

2. In a grain-drill, the furrow-openers consisting of concavo-convex disks attached rigidly to studs on the convex side of said disk, said stud passing through to the concave side and fitting within hubs, flat drag-bars attached only on the concave side of said disks, substantially as and for the purpose described.

3. In a grain-drill, flat spring-pressure bars attached to concavo-convex disks only on the concave side, said disks being rigidly attached to studs on the convex side, said stud passing through to the concave side of the disk, with a hub arranged for journaling same and supporting the grain-spout, substantially as and for the purpose described.

4. In a grain-drill or disk harrow, a single spring-pressure drag-bar attached to a hub receiving a stud to provide a journal for the disk on the concave side, said stud passing through to the convex side of the disk and rigidly attached thereto, substantially as and for the purpose described.

5. In a grain-drill having furrow-openers, consisting of concavo-convex disks rigidly attached to a stud on the convex side thereof, said stud passing through and entering a hub on the concave side of the disk, said hub attached to the single drag-bar, with the grain receiver or spout on the opposite or convex side of the disk, substantially as and for the purpose described.

6. In a grain-drill or disk harrow, a hub attached to the single drag-bar and receiving a stud attached to the convex side and passing through the disk and arranged to provide a journal for the disk on the concave side of said disk, a spacing-pin within said hub and rigidly clamped at one end of it to receive the stud on the concave side of the disk, substantially as and for the purpose described.

7. In a grain-drill the single drag-bar attached to a hub, a spacing-pin rigidly clamped at one end of said hub to receive the stud on the concave side of the revolving disk and to support the grain spout or receiver on the opposite or convex side of the disk, said disk rigidly attached to the stud on the convex side, substantially as and for the purpose described.

8. In a grain-drill the drag-bar attached to a hub, a spacing-pin fitting within said hub and rigidly clamped at one end, said pin being threaded at each end to receive clamping-nuts and having a small portion at each end square to hold it rigid and prevent it revolving, with a collar bearing against internal shoulders at one end of the hub, substantially as and for the purpose described.

9. In a grain-drill in combination with a hub attached to the drag-bar, a spacing-pin rigidly clamped within said hub and provided with a collar at one end to bear against the internal shoulders of the hub and a shoulder at the opposite end so as to hold the disk securely in place but permit it to revolve freely, substantially as and for the purpose described.

10. In a grain-drill furrow-opener consisting of a concavo-convex disk provided with a hollow stud on its concave side adapted to fit into a hub attached to the drag-bar and revolve freely therein, a clamping-bolt or spacing-pin passing through both the hub and the stud holding them firmly together but permitting the free revolution of the disk, substantially as and for the purpose described.

11. In a grain-drill a concavo-convex disk provided on its concave side with a hollow stud adapted to fit within a hub attached to the drag-bar, a grain spout or receiver on the opposite or convex side of the disk, all these parts held together by a clamping-pin passing through them and rigidly attached to the hub but permitting the free revolution of the disk, substantially as and for the purpose described.

12. In a grain-drill provided with furrow-openers consisting of concavo-convex revolving disks, with fixed or non-revolving scrapers or supports on the concave sides of the disks, bolted at one end to the hub attached to the drag-bar and at the other to the grain-spout carrier, substantially as and for the purpose described.

13. In a grain-drill or disk harrow the drag-bars attached to the hub of the disks by an adjustable attachment consisting of the elongated opening or slot to receive the rear bolt in combination with the washer for changing the angle of the disk, substantially as and for the purpose described.

14. In a grain-drill or disk-harrow construction, a flat drag-bar under spring-pressure attached to a hub, said hub receiving a stud rigidly attached to the disk on the convex side and passing through to the concave side thereof, said drag-bar attached at one end to the hub on the concave side only of said revolving disk and at the other end pivotally attached to the frame, substantially as and for the purpose described.

15. In a grain-drill, the combination of a grain spout or receiver on the convex side of a revolving disk and attached thereto by a spacing-pin passing through the hub, a supporting-hub receiving a stud attached on the convex side of the disk on the opposite or concave side of said disk attached to the drag-bar and means for connecting said drag-bar pivotally to the frame of the drill, substantially as and for the purpose described.

16. In a grain-drill the combination of a concavo-convex disk or furrow-opener provided with a hollow stud on its concave side revolving within a hub attached to the drag-bar and on the convex side a grain spout or receiver having a forwardly-extending projection with a square or angular opening to receive the angular portion of a spacing-pin, which passes through the hub and the stud of the disk and holds the parts firmly together and in place, substantially as and for the purpose described.

17. In a grain-drill having furrow-openers consisting of concavo-convex disks carrying on the same journals grain receiver or spout, said spout provided with a lug on its rear side to which may be bolted a bracket to guide and control the pressure-wheels, substantially as and for the purpose described.

EDWARD CHRISTMAN.
THOS. BRENNAN, JR.
LEVERETT W. HOMIRE.

Witnesses:
WM. O. MARSTRAND,
JOHN LOREY.